US008328000B2

(12) United States Patent
de Groot et al.

(10) Patent No.: US 8,328,000 B2
(45) Date of Patent: Dec. 11, 2012

(54) DEVICE SUITABLE FOR PROCESSING AGRICULTURAL PRODUCTS SUCH AS BULBOUS PLANTS, AS WELL AS SUCH A METHOD

(75) Inventors: John de Groot, Vessem (NL); Pedro Salcedo, Beersel (NL); Niek Koerselman, Escharen (NL); Tim Jaspers, Gassel (NL)

(73) Assignee: Dofra B.V. (NL)

( * ) Notice: Subject to any disclaimer, the term of this patent is extended or adjusted under 35 U.S.C. 154(b) by 148 days.

(21) Appl. No.: 12/721,102

(22) Filed: Mar. 10, 2010

(65) Prior Publication Data

US 2010/0230246 A1    Sep. 16, 2010

(30) Foreign Application Priority Data

Mar. 10, 2009  (NL) ...................................... 1036693

(51) Int. Cl.
*B65G 37/00* (2006.01)
(52) U.S. Cl. .................................................. 198/472.1
(58) Field of Classification Search ............... 198/470.1, 198/472.1, 474.1
See application file for complete search history.

(56) References Cited

U.S. PATENT DOCUMENTS

| | | | | |
|---|---|---|---|---|
| 4,968,081 A * | 11/1990 | Beight et al. | ................... | 294/104 |
| 5,040,836 A * | 8/1991 | Roudaut | ....................... | 294/203 |
| 5,375,898 A * | 12/1994 | Ohmori et al. | ................ | 294/207 |
| 5,483,042 A * | 1/1996 | Sprenger et al. | .............. | 219/647 |
| 5,795,448 A * | 8/1998 | Hurwitt et al. | ............. | 204/192.1 |
| 6,945,384 B2 * | 9/2005 | Sakota et al. | ............. | 198/690.1 |
| 7,281,710 B2 * | 10/2007 | Okazaki et al. | ................ | 271/193 |
| 7,597,187 B2 * | 10/2009 | Bausenwein et al. | .......... | 198/619 |
| 7,784,603 B2 * | 8/2010 | Burgmeier | ................. | 198/472.1 |
| 8,100,253 B2 * | 1/2012 | Walsh | ........................ | 198/476.1 |
| 2003/0080644 A1 | 5/2003 | Nelson et al. | | |

FOREIGN PATENT DOCUMENTS

NL   1028752   10/2006

OTHER PUBLICATIONS

International Search Report dated Nov. 5, 2009, for NL 1036693.

* cited by examiner

*Primary Examiner* — Douglas Hess
(74) *Attorney, Agent, or Firm* — Barnes & Thornburg LLP

(57) ABSTRACT

A device which is suitable for processing agricultural products such as bulbous plants, is provided at least with at least a magnetic track comprising a number of magnet segments of alternating polarity. The device is further provided with at least one magnet which is movable with respect to the magnetic track. A function element connected to the magnet is movable in dependence on the position of the magnet relative to the magnet segments of the magnetic track.

15 Claims, 14 Drawing Sheets

DEVICE SUITABLE FOR PROCESSING AGRICULTURAL PRODUCTS SUCH AS BULBOUS PLANTS, AS WELL AS SUCH A METHOD

The invention relates to a device suitable for processing agricultural products such as bulbous plants.

The invention further relates to a method suitable for processing agricultural products such as bulbous plants.

In such a device, which is known from Dutch patent NL 1028752 C, four pairs of arms are each provided with a clamp at one end. The arms are rotatable about a central axis. First the head and the root of an agricultural product to be processed, for example an onion, are removed, whereupon a cut is formed on either side of the onion, which cuts extend between the head and the root part of the onion. Then the onion is clamped down by electrically or mechanically activating the clamps. In the clamped position of the onion, the aforesaid parts face the clamps. Following that, the onion is rotated by the clamps about an axis of rotation extending through the clamps, whilst a knife is pressed against the outer side of the onion. In this way a cut is made in the entire circumference of the onion. At the same time, the arms with the clamps and the onion clamped therebetween are rotated about the central axis. After the cut has been made, the outer skin parts of the onion, which are now loose on the onion, are blown off the onion by means of a blowing device. Then the clamps are moved apart, whereupon the peeled onion is discharged.

In the known device, the rotation of the clamps about their axis of rotation and the simultaneous rotation of the clamps about the central axis is effected by means of a number of ropes. Activation of the clamps so as to clamp down or release an onion is effected by mechanical drive means comprising curve discs and draw springs.

A drawback of the known device is the fact that, partly on account of the presence of the ropes, the device is difficult to clean. Furthermore, because of the various parts sliding past one another, the device is subject to wear. In addition, the known device comprises relatively many parts, so that assembly and any repairs take a relatively great deal of time.

The object of the invention is to provide a device in which a function element such as a clamp, for example, can be driven in a simple manner.

This object is accomplished with the device according to the invention in that the device is provided at least with a magnetic track comprising a number of magnet segments of alternating polarity, which device is further provided with at least one magnet which is movable with respect to the magnetic track, whilst a function element connected to the magnet is movable in dependence on the position of the magnet relative to the magnet segments of the magnetic track.

The magnetic track and the magnet cooperating therewith make it possible to realise a quick movement of the function element. An air gap may be present between the magnetic track and the magnet at all times, so that there will be no wear. Furthermore, the magnetic track and the magnet are thus much easier to clean and maintain in comparison with the known device. Moreover, separate mechanical or electrical drive means for the function element are not needed when permanent magnets are used.

One embodiment of the device according to the invention is characterised in that the magnetic track extends at least partially along the circumference of a circle, whilst the device further comprises a holder which is rotatable about the central axis of the circle, which holder is provided with a number of clamping devices spaced from the central axis, each clamping device being provided with a function element and with a magnet that cooperates with the magnetic track.

During rotation of the holder about the central axis, the magnet is constantly positioned opposite a different part of the magnetic track. Depending on whether the polarity of the magnet segments is the same as or the opposite of the polarity of the magnet, the magnet will be repelled or attracted, causing the magnet, and consequently the function element connected thereto, to be moved. During rotation of the holder, magnets of different clamping devices are preferably simultaneously located opposite the magnetic track, so that different function elements can be driven simultaneously. The magnetic track may extend along the entire circumference of the circle. However, if the clamping devices need not be activated in a particular part of the circle during their rotation about the central axis, there is no need to provide a magnetic track along said part of the circle.

Another embodiment of the device according to the invention is characterised in that each clamping device is provided at least with a housing and with a clamp forming the function element, which is movable with respect to the housing, which clamp is connected to the magnet, wherein said clamp is movable with respect to the housing in use as a result of the cooperation between the magnet and the magnet segments of the magnetic track.

In this way movement of the clamp is realised in a simple manner.

Yet another embodiment of the device according to the invention is characterised in that the clamp is mounted for rotation about an axis of rotation in the housing, the clamping device being provided with a circular magnetic track comprising said magnet and further magnets, which magnets are of alternating polarity, wherein the circular magnetic track, and consequently the clamp, is rotatable about the axis of rotation in use upon rotation of the holder about the central axis.

Upon rotation of the holder about the central axis, the magnets of the circular magnetic track roll along the magnet segments of the magnetic track, as it were. Rotation of the clamp is thus realised in a simple manner. In this way various clamps of different clamping devices can be rotated simultaneously and independently of each other.

Yet another embodiment of the device according to the invention is characterised in that the spacing between two successive magnet segments of the magnetic track is substantially the same as the spacing between two successive magnets of the circular magnetic track of the clamping device.

In this way an even rotational speed is obtained.

Yet another embodiment of the device according to the invention is characterised in that the clamp is mounted for sliding movement along an axis of translation extending parallel to the central axis in the housing, wherein the magnet connected to the clamp, and consequently the clamp, is translatable along the axis of translation in use upon rotation of the holder about the central axis.

In this way the clamp can be moved from a position in which the agricultural product is being clamped to a position in which said product is being released, and vice versa, in a simple manner at a position determined by the magnetic track. A separate control element is not needed. The product can be engaged by the clamp, be clamped against a disc rotating at the same time or be clamped between said clamp and another clamp.

When relatively strong magnets are used, for example supermagnets, translation of the clamp will take place at a relatively high speed.

Another embodiment of the device according to the invention is characterised in that the device comprises at least two magnetic tracks, wherein the first magnetic track cooperates with the circular magnetic track for rotating the clamp, whilst the second magnetic track cooperates with a magnet provided for translating the clamp.

The use of two magnetic tracks makes it possible to translate as well as rotate the clamp. The magnet used for translating the clamp is not the same magnet as the magnets used for rotating the clamp. All magnets are connected to the clamp, however. Yet another embodiment of the device according to the invention is characterised in that the device is provided with two pairs of first and second magnetic tracks and also with two holders which are rotatable about the central axis, wherein clamping devices of the two holders are located opposite each other.

In this way the agricultural product is clamped between two clamps of opposing clamping devices and subsequently rotated about the axis of rotation by means of the two clamps. Preferably, cutting devices and/or blowing devices are disposed between the holders, which devices subject the agricultural product to a cutting operation and/or a blowing operation, respectively. Also other processing tools, such as brushes, scrapers, polishing tools, atomizers, spray nozzles, carving tools etc are conceivable.

The invention further relates to a method which is characterised in that at least one magnet is moved with respect to a magnetic track comprising a number of magnet segments of alternating polarity, wherein said magnet is repelled or attracted and wherein a function element connected to the magnet is moved.

As a result, a function element can be moved in a simple manner, whilst contact between the magnetic track and the magnet is not required. In this way wear and fouling are prevented.

An embodiment of the method according to the invention is characterised in that an agricultural product is clamped between clamps near a receiving position, which clamps are moved together by means of magnets, whereupon the agricultural product is rotated together with the clamps about an axis of rotation extending through the clamps, whilst the agricultural product is also rotated by means of magnets about a central axis spaced from the axis of rotation and the agricultural product is subjected to a processing step, after which the clamps are moved apart by means of magnets near a delivery position.

The overall process of clamping, turning, rotating and releasing the clamps is carried out by merely rotating the clamps about the central axis, thereby positioning the magnets connected to the clamps opposite stationary magnets or magnet segments.

The invention will now be explained in more detail with reference to the drawing, in which.

Like parts are indicated by the same numerals in the figures.

Figure 1:
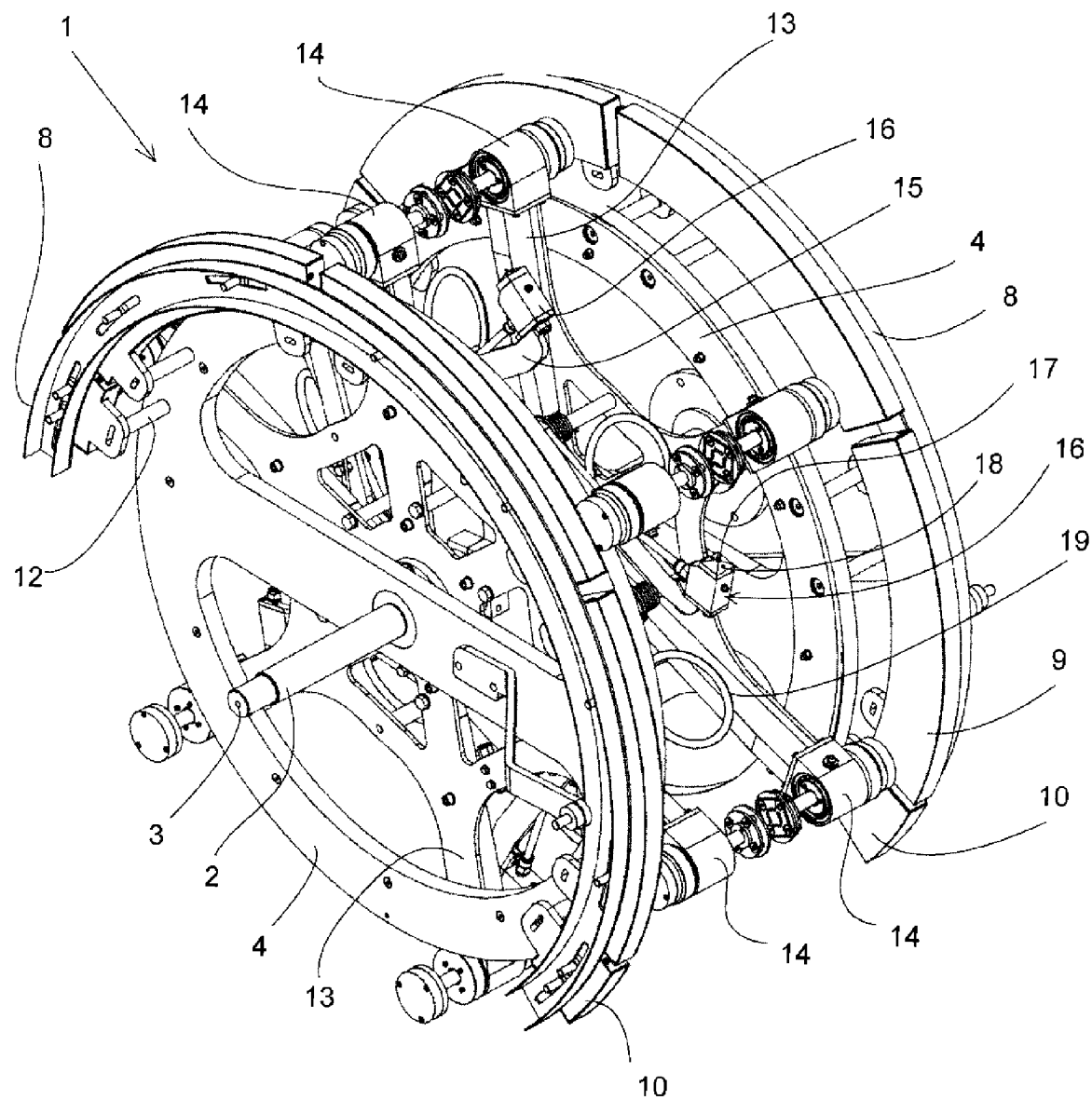
FIG. 1 is a perspective view of an embodiment of a device according to the invention.
Figure 2:
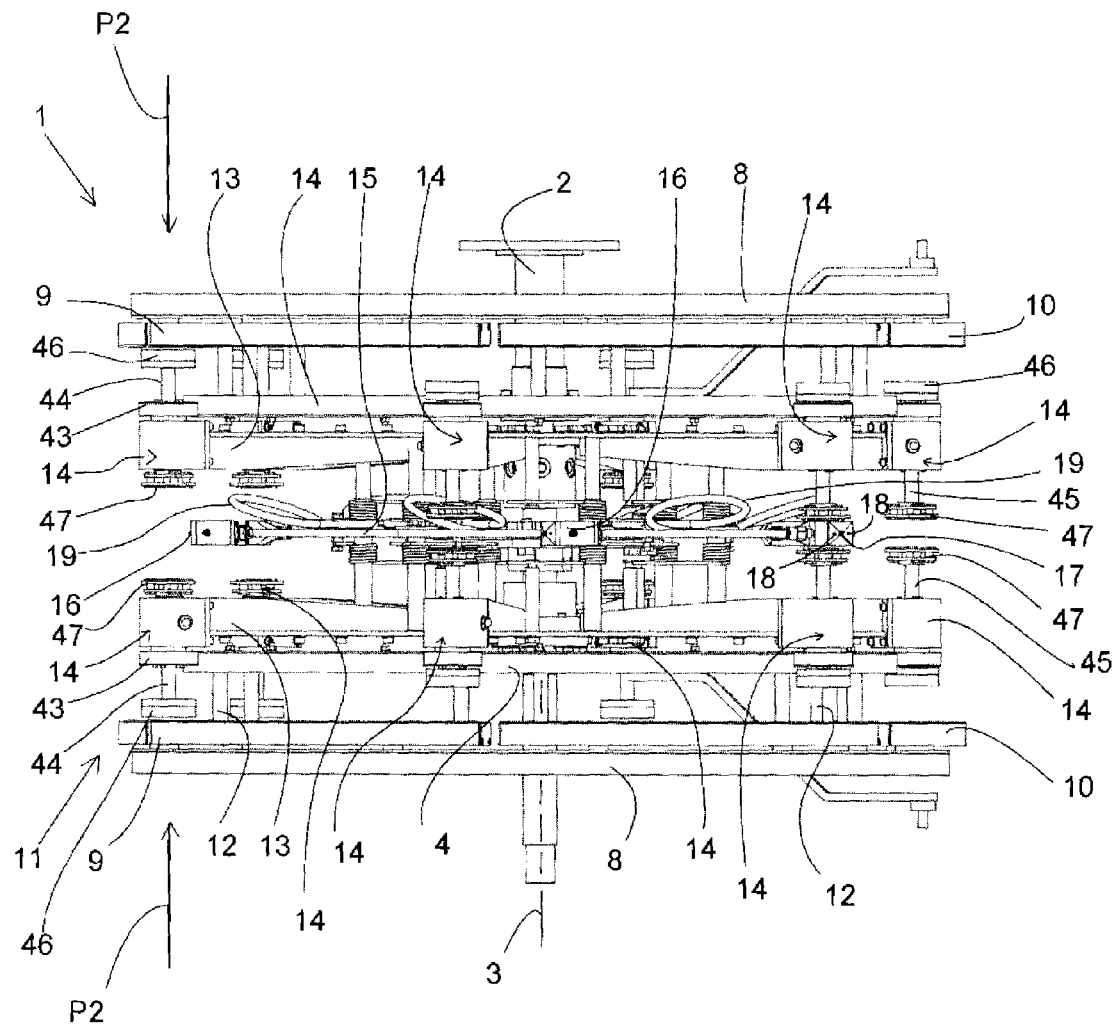
FIG. 2 is a top plan view of the device shown in FIG. 1.
Figure 3:
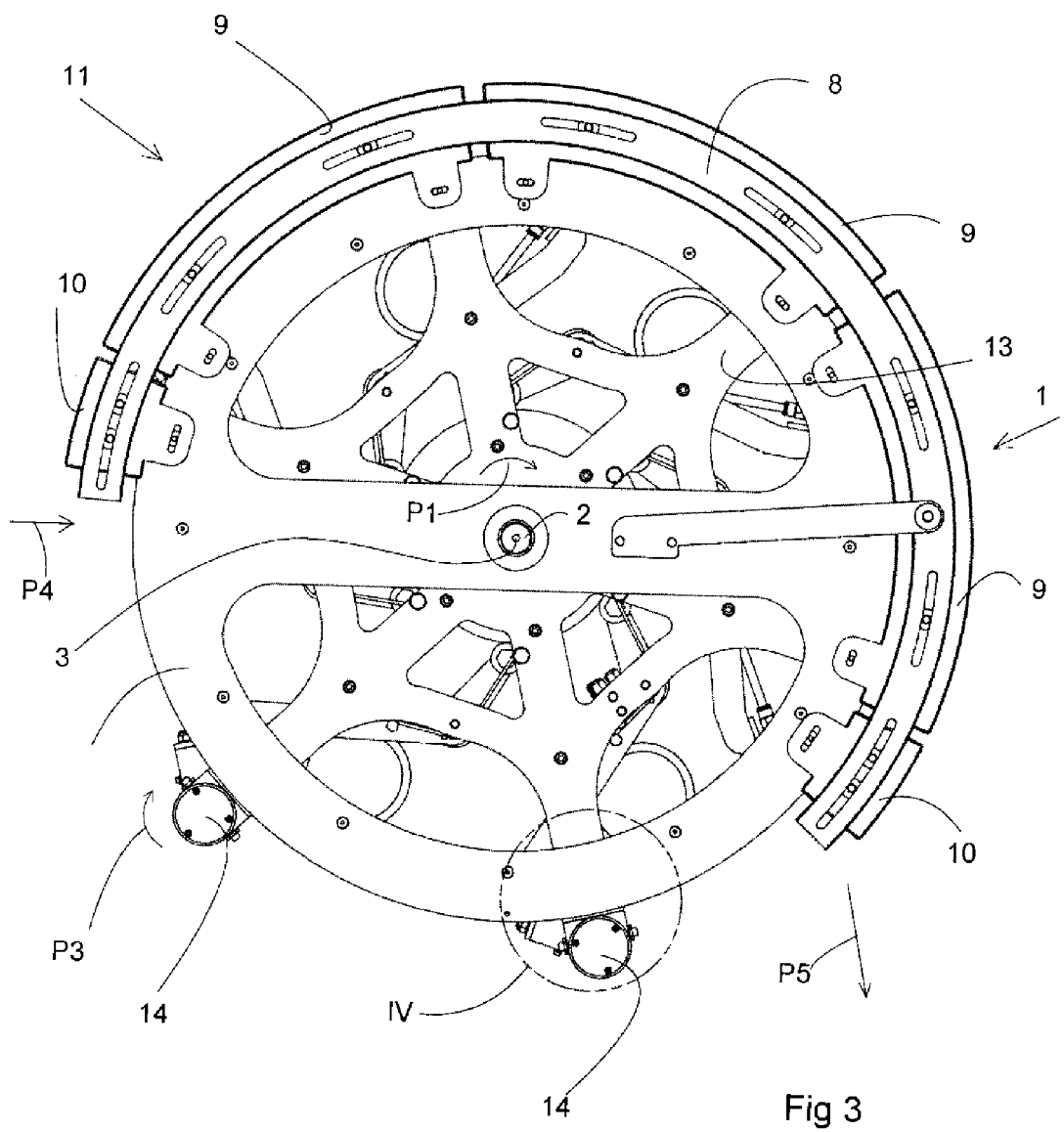
FIG. 3 is a front view of the device shown in FIG. 1.
Figure 5:
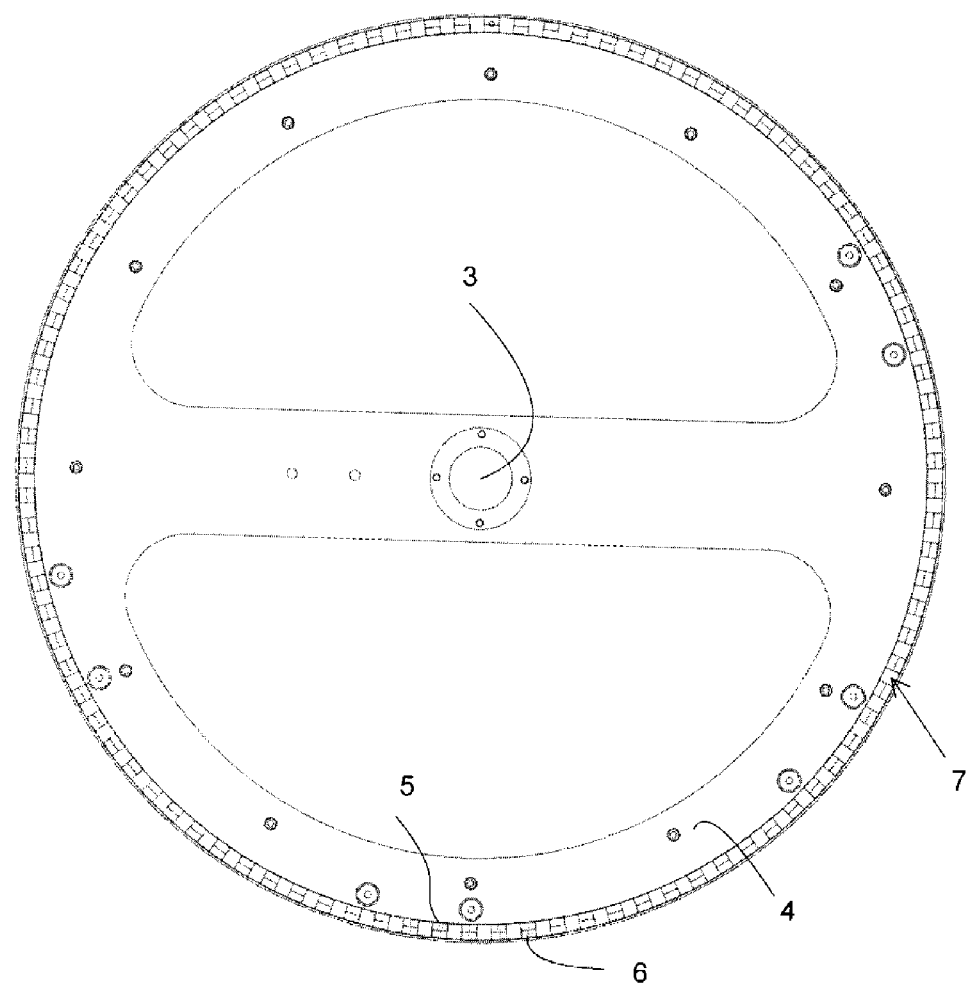
FIG. 5 shows a first magnetic track extending in a circle of the device shown in FIG. 1.
Figure 6:
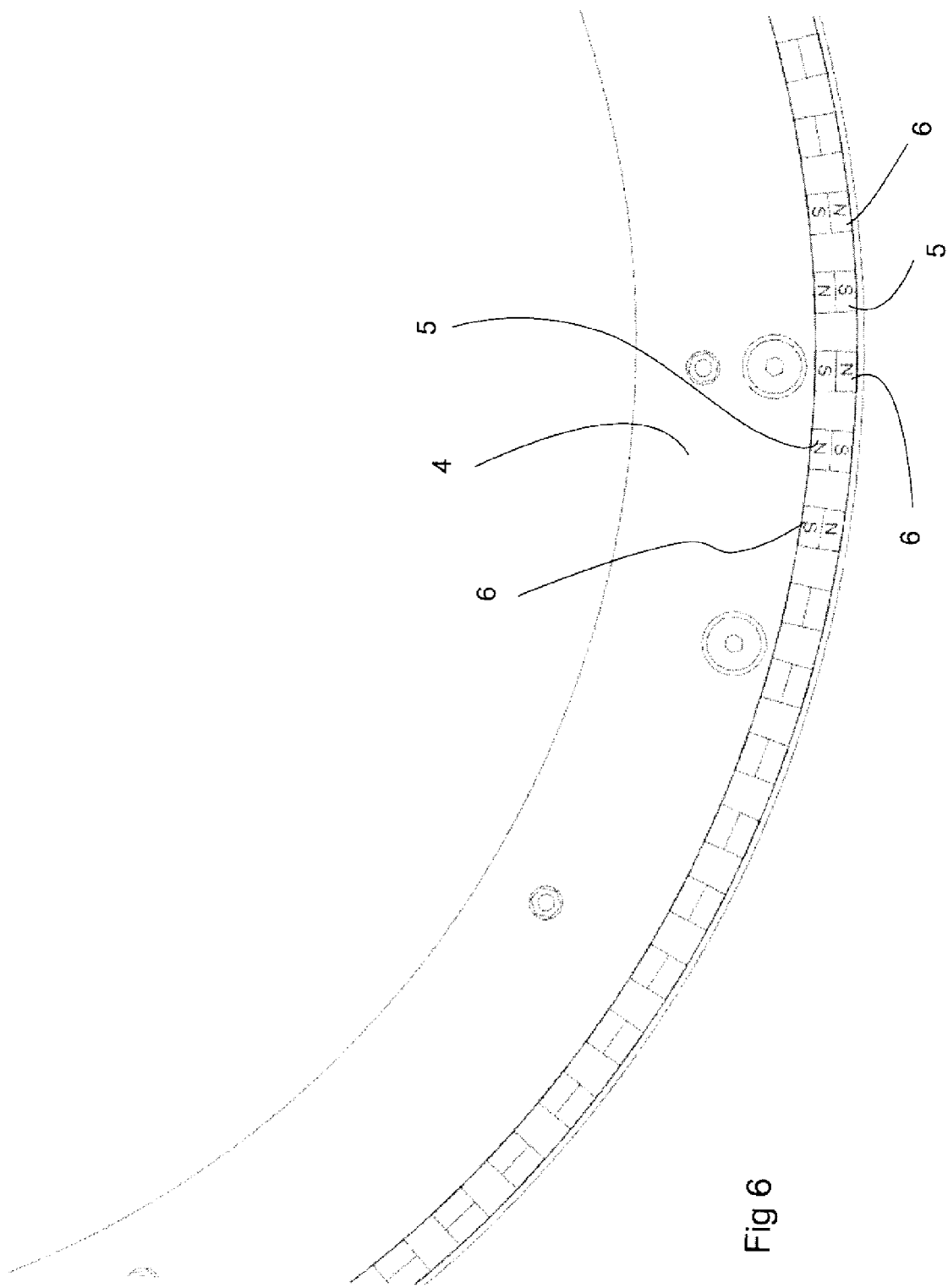
FIG. 6 is a larger-scale detail view of the first magnetic track shown in FIG. 5.

FIGS. 1-3 show a perspective view, a top plan view and front view, respectively, of a device 1 according to the invention suitable for processing agricultural products such as onions, for example. The device 1 has a central shaft 2, which extends along a central axis 3. The shaft 2 extends through two stationarily disposed ring-shaped discs 4. Each ring-shaped disc 4 is circumferentially provided with a number of magnet segments 5, 6 of alternating polarity, which jointly form a first magnetic track 7. The magnetic track 7 extends along the entire circumference of a circle whose centre coincides with the central axis 3 of the central shaft 2. In the case of the magnet segments 5, the S pole is located on the outer side of the ring-shaped disc 4, whilst the N pole is located on the inner side. In the case of the magnet segments 6, the S pole is located on the inner side of the ring-shaped disc 4, whilst the N pole is located on the outer side. Also refer to FIGS. 5 and 6 in this regard.

On sides of the ring-shaped discs 4 that face away from each other, the device 1 is provided with circular segmental carriers 8, which each comprise three side-by-side magnet segments 9 of the same polarity and two magnet segments 10 disposed near ends of the magnet segments 9, whose polarity is opposite to that of the magnet segments 9. The polarization direction of the magnet segments 9, 10 is parallel to the direction in which the central axis 3 extends. The magnet segments 9, 10 jointly form a second magnetic track 11. The second magnetic track 11 only extends over part of the circumference of a circle. The number of polarity changes at the second magnetic track 11 is only two, whereas a large number of polarity changes occur at the first magnetic track. The second magnetic tracks 11 lie on a larger-diameter circle than the first magnetic track 7. The second magnetic tracks 11 are connected to the ring-shaped discs 4 via spacers 12.

Disposed between the ring-shaped discs 4 are two disc-shaped holders 13, which are connected to the central shaft 2 and which are rotatable about the central axis 3 in the direction indicated by the arrow P1. The rotation of the holders 13 is effected by driving the central shaft 2 by means of an electric motor (not shown). On an outer side remote from the central axis, each holder 13 is provided with six clamping devices 14 which are spaced out evenly along the circumference.

Disposed between the holders 13 are six arms 15, which are rotatable about the central axis 3 together with the holders 13. Each arm 15 is furthermore pivotable about the central axis 3 in directions away from and towards the clamping device 14 via its own drive means (not shown). Each arm 15 is provided with a cutter head 16 on a side remote from the central axis 3, which cutter head comprises a sharp cutting point 17 as well as two air inlets 18 provided on either side of the cutting point 17. The air inlets 18 are supplied with compressed air via air supply lines 19.

Figure 7:
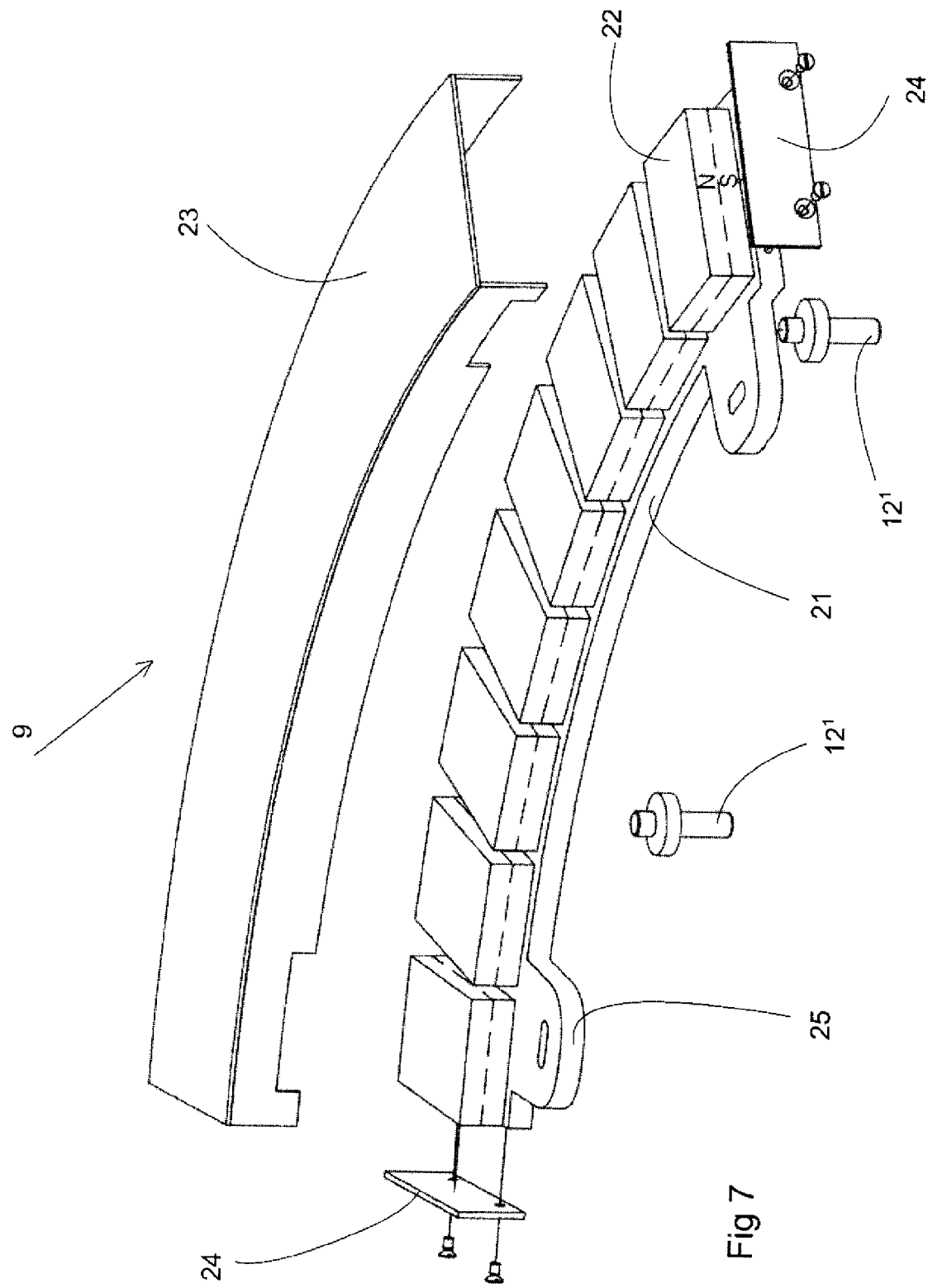
FIG. 7 is an exploded perspective view of a first part of a second magnetic track extending in a circle of the device shown in FIG. 1.
Figure 8:
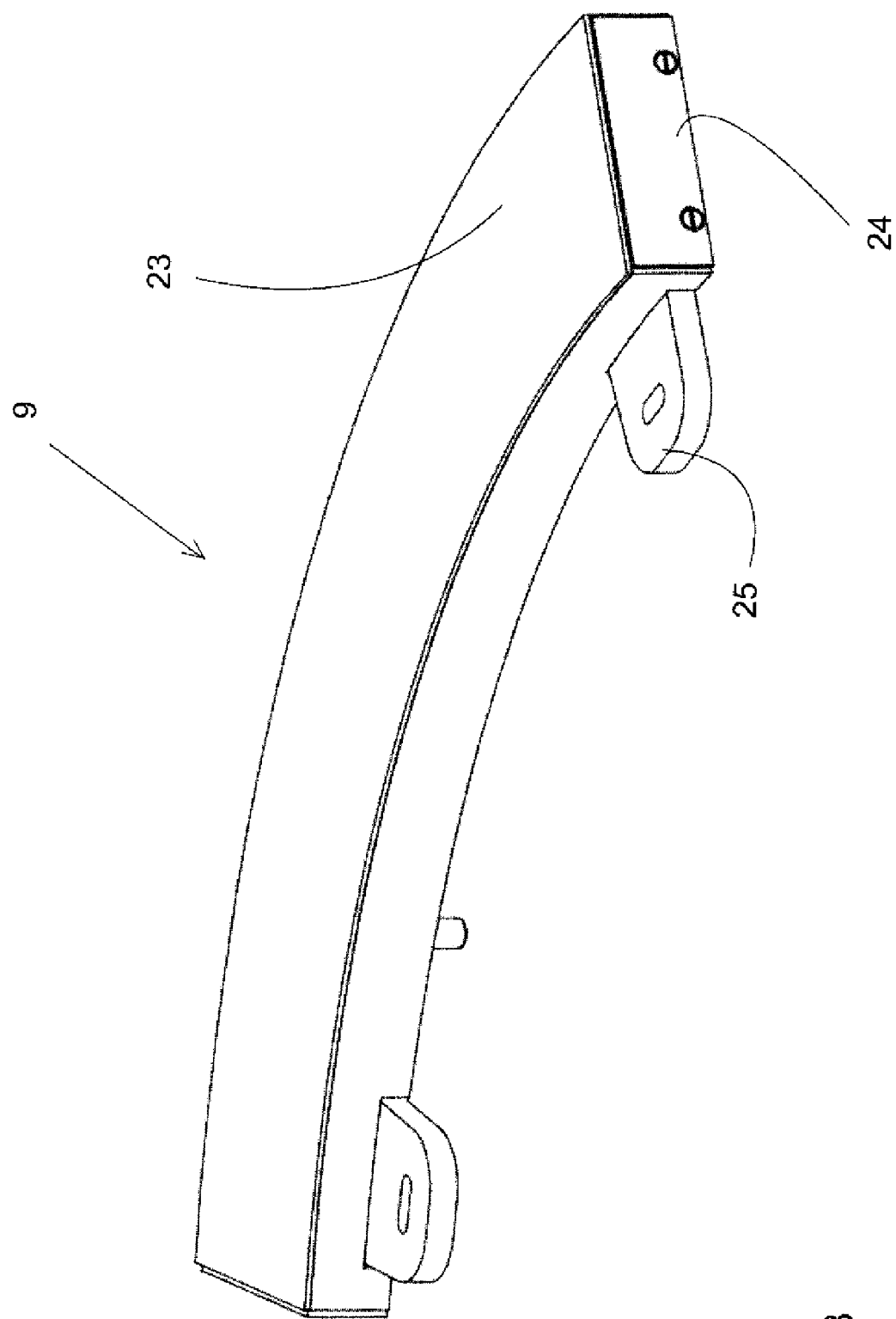
FIG. 8 is a composite perspective view of the first part shown in FIG. 7.

FIGS. 7 and 8 show the magnet segment 9. As FIG. 7 clearly shows, the magnet segment 9 is provided with a steel baseplate 21, magnet elements 22 disposed thereon, a cover 23 covering the magnet elements 22 and end covers 24. The steel baseplate 21 is provided with fastening elements 25 for fastening the magnet segment 9 to the ring-shaped disc 4 via the spacers 12. The magnetic elements 32 are polarized in such a manner that the N pole is located on a side remote from the baseplate 21, whilst the N pole is located near the baseplate 21.

Figure 9:
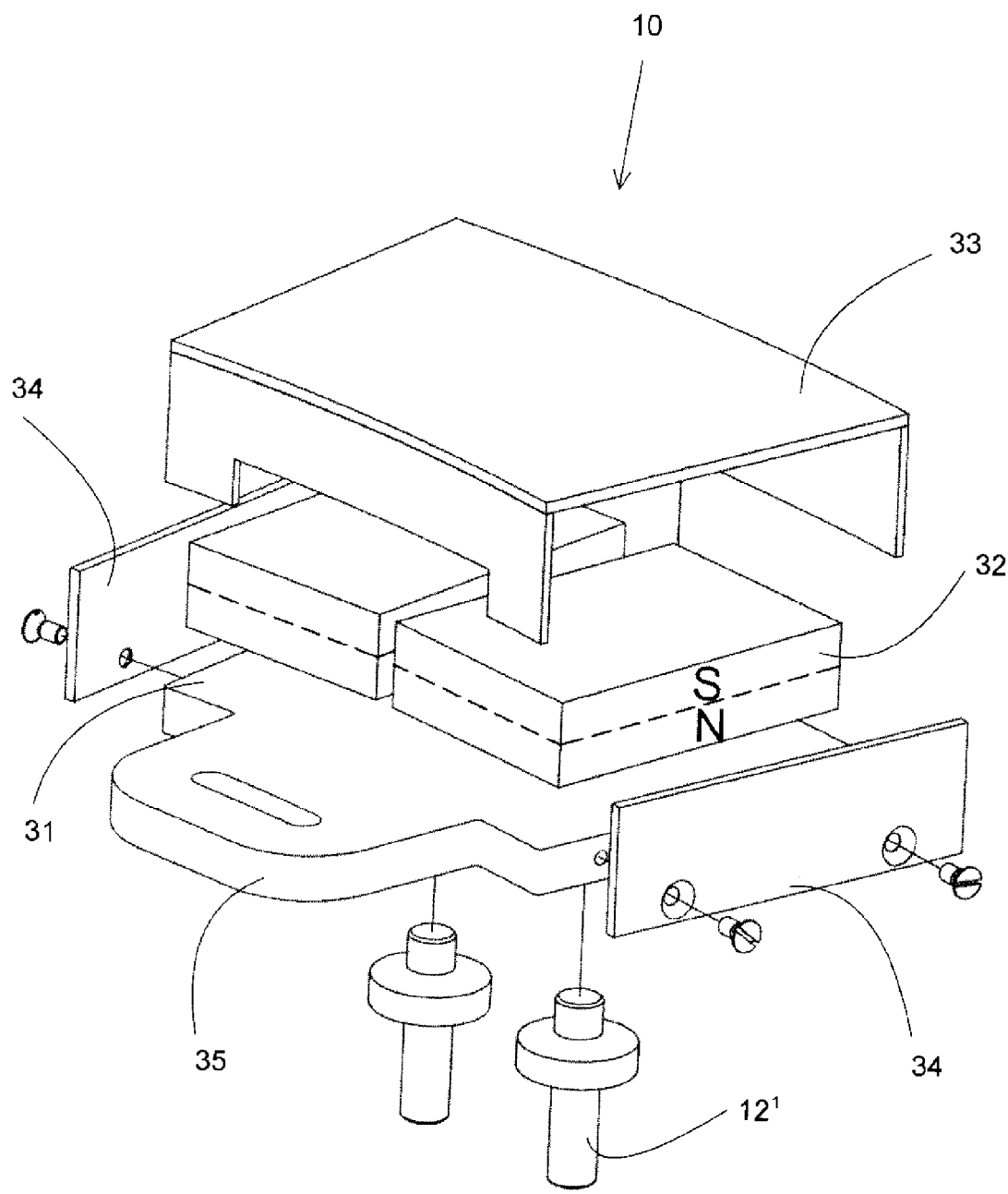
FIG. 9 is an exploded perspective view of a second part of a second magnetic track extending in a circle of the device shown in FIG. 1.
Figure 10:
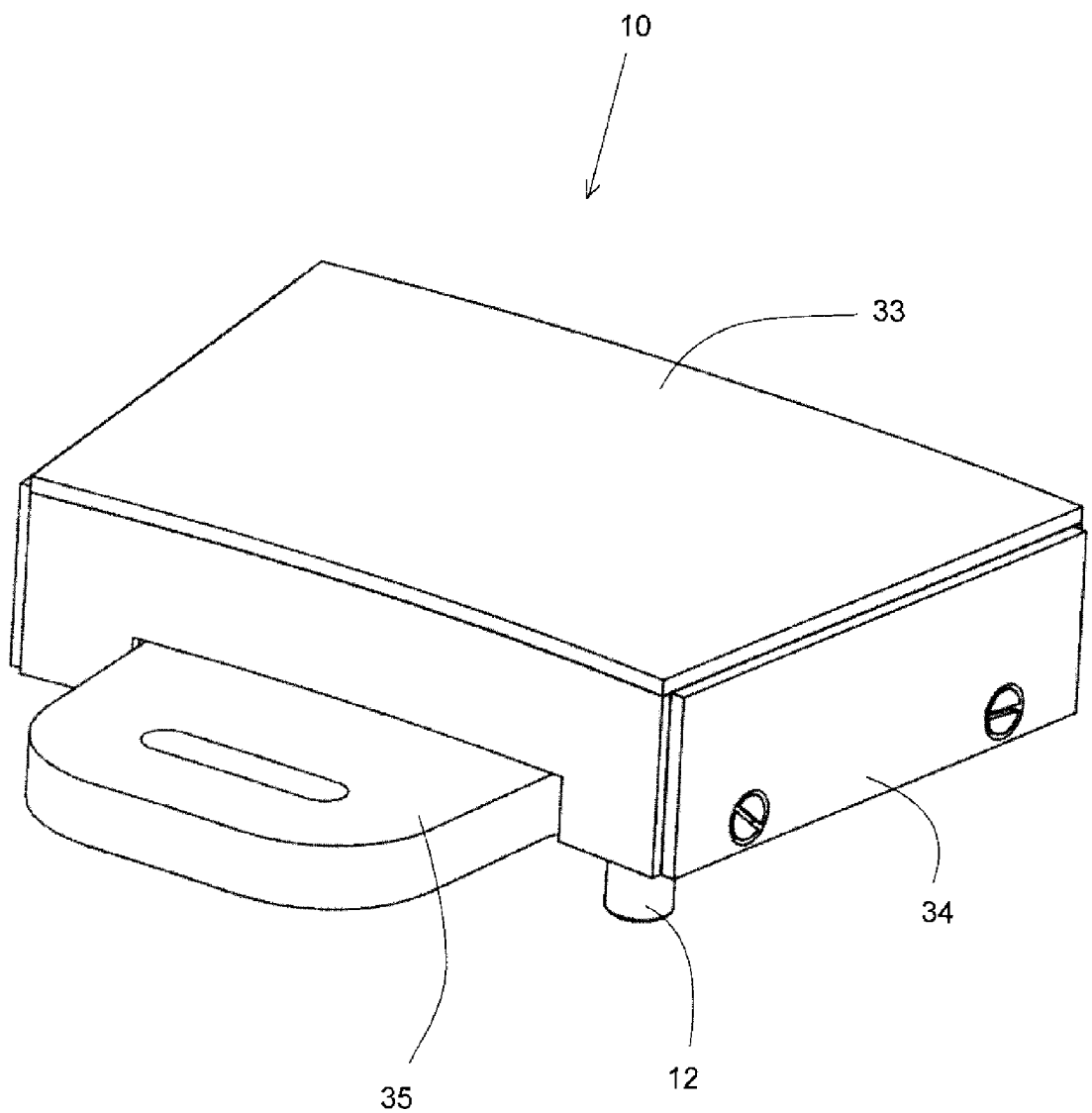
FIG. 10 is a composite perspective view of the second part shown in FIG. 9.
Figure 11:
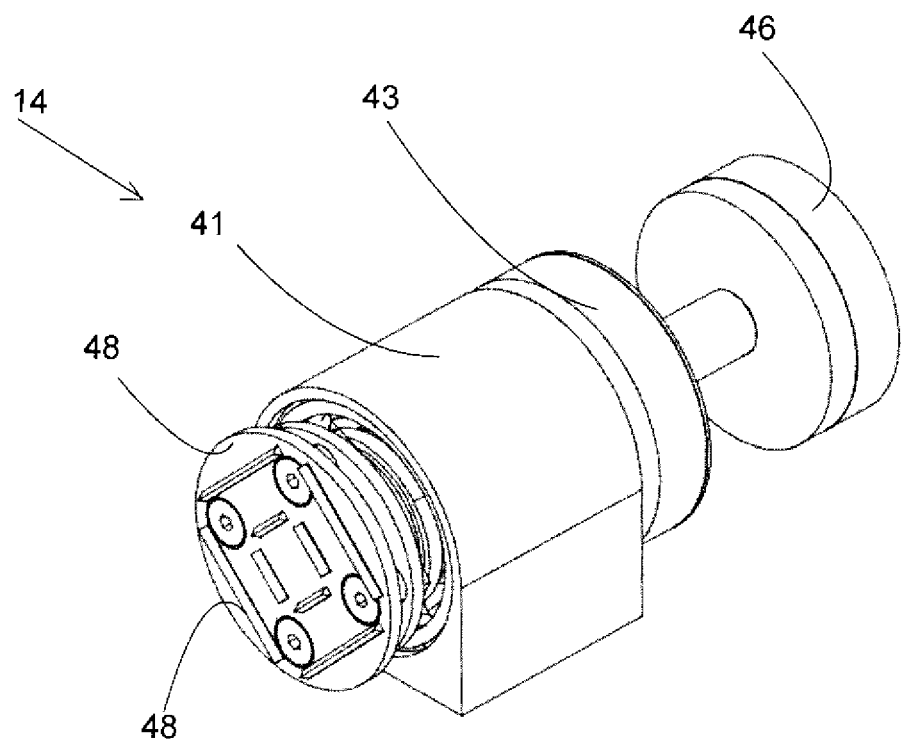
FIG. 11 is a perspective view of a clamping device of the device shown in FIG. 1.
Figure 12:
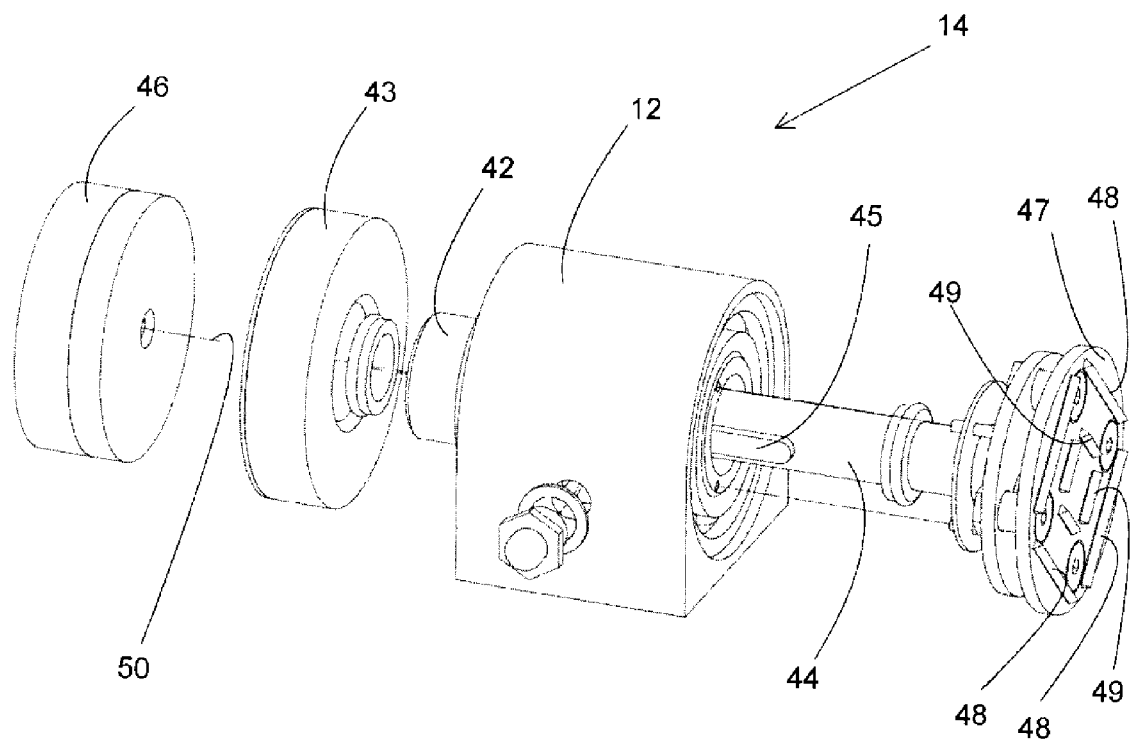
FIG. 12 is an exploded perspective view of the clamping device shown in FIG. 11.
Figure 13:
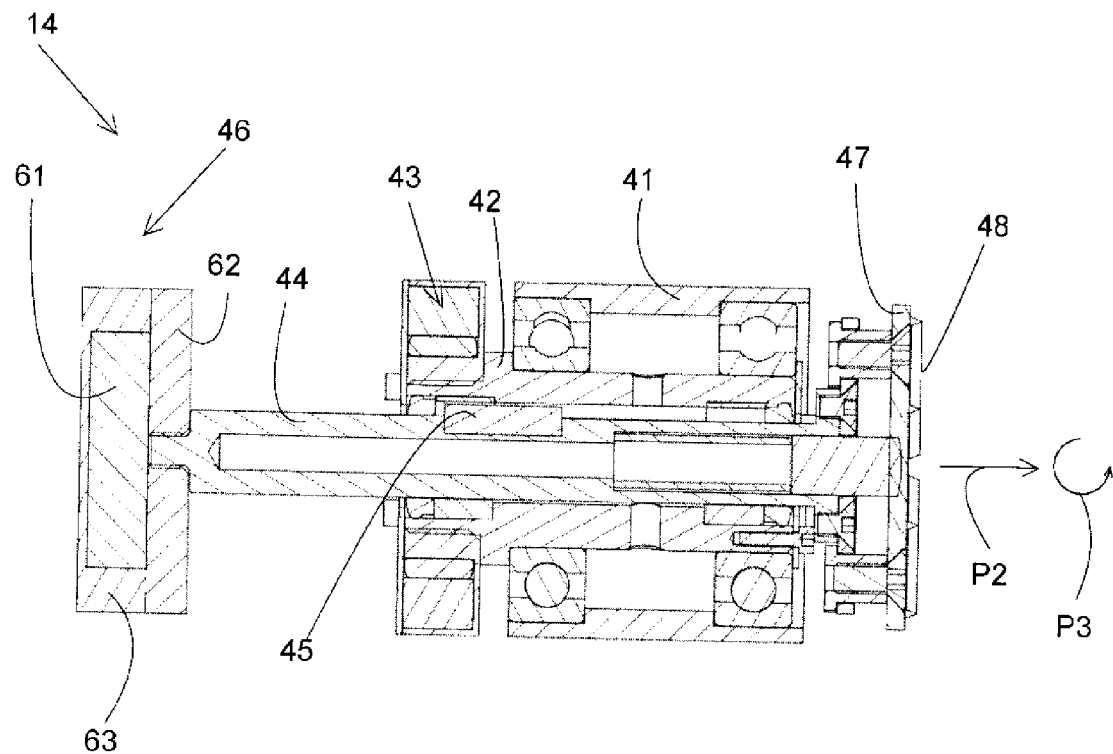
FIG. 13 is a cross-sectional view of the clamping device shown in FIG. 11.
Figure 14:
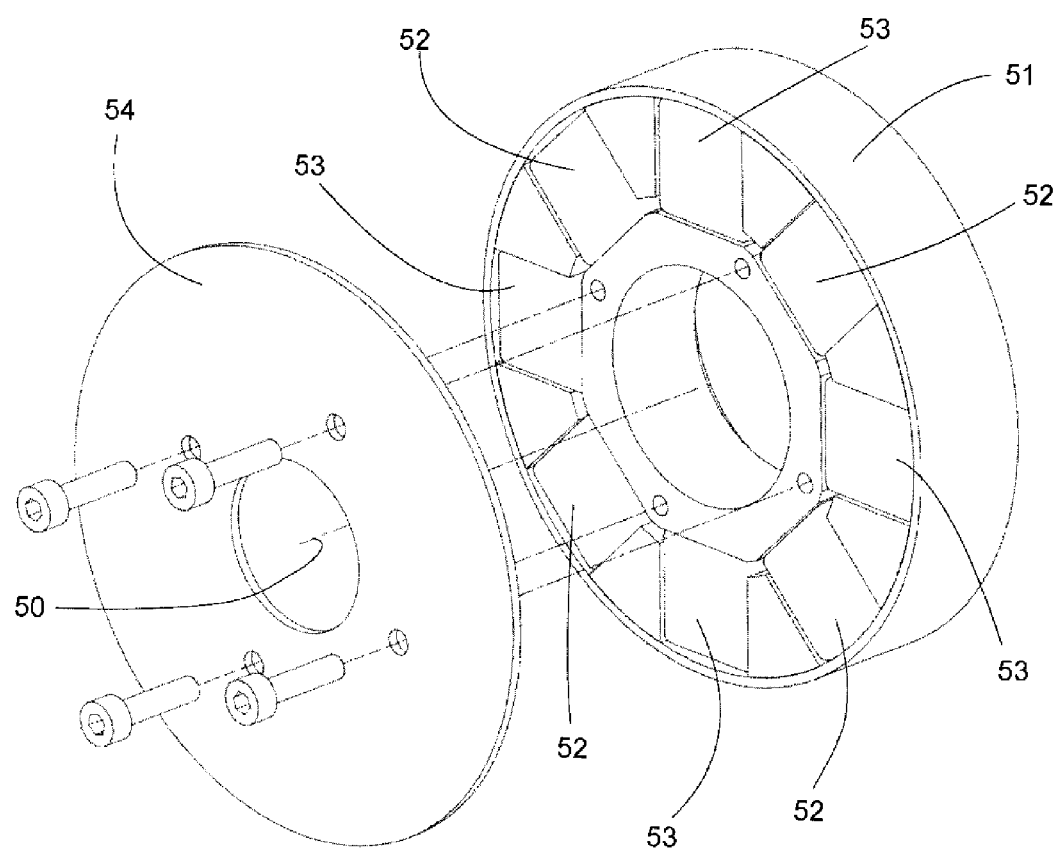
FIG. 14 is a larger-scale, exploded perspective view of the circular magnetic track of the clamping device shown in FIG. 11.

FIGS. 9 and 10 show the magnet segment 10. As FIG. 9 clearly shows, the magnet segment 10 is provided with a steel baseplate 31, magnet elements 32 disposed thereon, a cover 33 covering the magnet elements 32 and end covers 34. The steel baseplate 31 is provided with fastening elements 35 for fastening the magnet segment 10 to the ring-shaped disc 4 by means of the spacers 12. Spacers 12' are provided for fastening the magnet segments 9, 10 to the circular carrier 8. The magnetic elements 32 are polarized in such a manner that the S pole is located on a side remote from the baseplate 31, whilst the N pole is located near the baseplate 31.

FIGS. 11-14 show various views of the clamping device 14. The clamping device 14 comprises a housing 41, which is detachably mounted on the holder 13. As a result, replacing the clamping device 14 in case of a malfunction is very easy. Mounted in the housing 41 is a hollow shaft 42, which is provided with a first magnet holder 43 at one end. Mounted in the hollow shaft 42 is a shaft 44, which shaft 44 is slidable within the hollow shaft 42 in the direction indicated by the arrow P2 and in the opposite direction. The shaft 44 is locked against rotation with respect to the hollow shaft 42 by means of a peg 45. The shaft 44 extends on either side of the housing 41. At an end located near the first magnet holder 43, the shaft 44 is provided with a second magnet holder 46. On a side of the housing 41 remote from the magnet holders 43, 46, the shaft 44 is provided with a clamp 47. The clamp 47 is provided with elongated projections 48, 49, which are arranged in two squares. The angle included by two projections 48, 49 disposed beside each other points towards the centre of the clamp 47. As a result, a good clamping engagement of the agricultural product to be clamped is obtained.

The hollow shaft 42 is rotatable, together with the first magnet holder 43, the shaft 44, the second magnet holder 46 and the clamp 47, in the direction indicated by the arrow P3 about the central axis of the hollow shaft 42 and the shaft 44 that forms the axis of rotation 50.

The first magnet holder 43 has a chamber 51, in which eight magnets 52, 53 are present. The magnets 52, 53 form a circular magnetic track. The magnets 52 are polarised in such a manner that the S pole is located on a side remote from the axis of rotation 50 whilst the N pole faces the axis of rotation 50. The magnets 53 are polarised in such a manner that the N pole is located on a side remote from the axis of rotation 50, whilst the S pole faces the axis of rotation 50. Also refer to FIG. 4 in this regard. The chamber 51 is closed by means of a cover plate 54.

The second magnet holder 46 comprises a magnet 61 which abuts against a steel plate 62 on a side facing the first magnet holder 43. The magnet 61 is hidden from view by a cover 63. The N pole of the magnet 61 is located on a side remote from the steel plate 62, whilst the S faces the steel plate 62.

Figure 4:
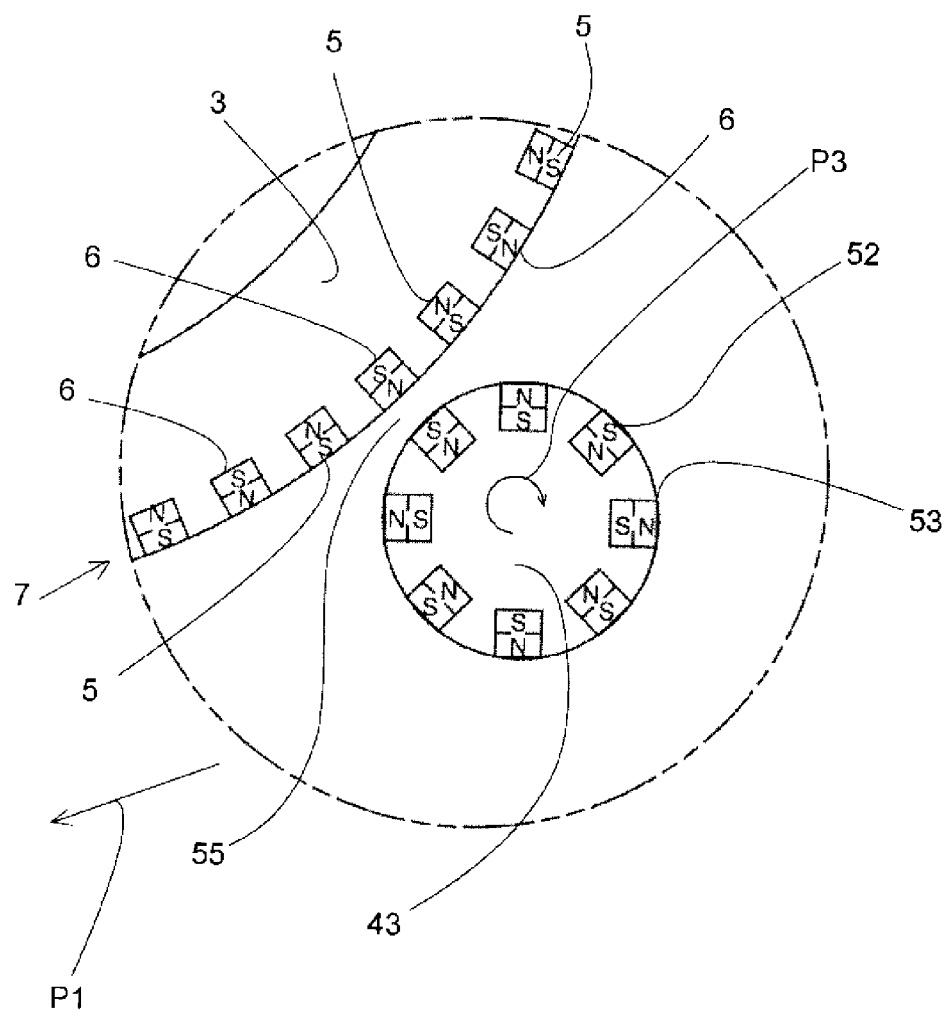
FIG. 4 shows a larger-scale detail IV of the device shown in FIG. 3.

As is clearly shown in FIG. 4, the first magnet holders 43 of the clamping devices 14 are disposed opposite the ring-shaped holder 4, whilst an air gap 55 is present between the magnet segments 5, 6 and the magnets 52, 53. The spacing between the magnet segments 5, 6 is the same as the spacing between the magnets 52, 53.

A number of second magnet holders 46 are disposed opposite the magnet segments 9, 10.

The operation of the device 1 according to the invention is as follows.

Via a feed mechanism (not shown) an agricultural product such as an onion, for example, is transported in the direction indicated by the arrow P4 to a receiving position between the magnet segments 10. Disposed between the magnet segments 10 is a pair of opposing clamping devices 14. The magnets 61 of the second magnet holder 46 are attracted by the magnet segments 10, causing the clamps 47 to be moved apart. An onion can now be positioned between the clamps 47. By further rotating the holders 13 in the direction indicated by the arrow P1, the second magnet holders 46 of the clamping devices 14 are positioned opposite the magnet segments 9, which have a polarity opposite to the polarity of the magnet segments 10. As a result, a repelling force will be exerted on the magnets 61, causing the second magnet holders 46, the shafts 44 connected thereto and the clamps 47 to be moved in the direction indicated by the arrow P2 with respect to the housing 41. During said movement, the projections 48, 49 are pressed into the parts of the onion from which the head and the root were removed, so that the onion will be clamped between the clamps 47.

During the rotation of the holders 13 in the direction indicated by the arrow P1, the magnets 53 are attracted by the magnet segments 5 on the disc 4, whilst the magnets 52 are attracted by the magnet segments 6 on the disc 4. As a result, the first magnet holders 43 will rotate in the direction indicated by the arrow P3. As a result of the rotation of the magnet holders 43, also the hollow shafts 42, the shafts 44, the second magnet holders 46, the clamps 47 and the onion clamped between the clamps 47 will rotate.

Then the cutter head 16 associated with a pair of clamping devices 14 is moved towards the onion and pressed into the onion. Because the onion is rotated at the same time, the cutting point 17 makes a cut in the entire circumference of the onion. Then compressed air is led to the air inlets 18 via the air supply line 19, as a result of which loose skin parts will be blown off the onion. Subsequently the cutter head 16 is moved away from the onion again. Once the clamping devices 14 are positioned between the magnet segments 10 on the right-hand side of the device 1 shown in FIG. 3 as a result of the rotation of the holders 13, the second magnet holders 46 are attracted by the magnet segments 10 and moved in the opposite direction of the arrow P2, thereby releasing the clamping engagement of the onion. The onion is subsequently discharged in the direction indicated by the arrow P5.

No magnet segments 9, 10 are present at the bottom side of the device 1, because the question whether or not the clamps 47 are open is not relevant at that location.

If desired, it is also possible to leave out the magnets 5, 6 on the disc at the bottom side.

It is also possible to vary the spacing between the magnets 5, 6 along the circumference of the disc, as a result of which a varying rotational speed of the clamps is obtained.

It is also possible to effect only the clamping action or only the rotation of the clamps by means of cooperating magnets and magnetic tracks.

It is also possible to effect only the closing of the clamps by means of magnetic force and to open the clamps by means of spring force, for example, or to allow the product to fall out of the clamps under the influence of the force of gravity.

It is also possible to effect the movement of the arms 15 by means of cooperating magnets and magnetic tracks in the same manner as the opening and closing of the clamps 47 and the rotation of the clamps 47.

It is also possible to process other agricultural products, such as tuberous products, cabbages, etc.

It is also possible to carry out other operations on the agricultural product.

It is also possible to mount the clamping devices on an endless conveyor belt and to have said belt move the clamping devices relative to a linear magnetic track comprising a number of magnet segments of alternating polarity.

The invention claimed is:

1. A device suitable for processing agricultural products such as bulbous plants, characterised in that the device is provided at least with a magnetic track comprising a number of magnet segments of alternating polarity, which device is further provided with a housing comprising at least one magnet and a function element connected to the magnet and with driving means for moving the housing with respect to the magnetic track, whereby the at least one magnet is also being displaced with respect to the magnetic track, whilst the function element connected to the magnet is movable with respect to the housing in dependence on the position of the magnet relative to the magnet segments of the magnetic track.

2. A device according to claim 1, characterised in that the magnetic track extends at least partially along the circumference of a circle, whilst the device further comprises a holder which is rotatable about the central axis of the circle, which holder is provided with a number of clamping devices spaced from the central axis, each clamping device being provided with a function element and with a magnet that cooperates with the magnetic track.

3. A device suitable for processing agricultural products such as bulbous plants, characterised in that the device is provided at least with a magnetic track comprising a number of magnet segments of alternating polarity, which device is further provided with at least one magnet which is movable with respect to the magnetic track, whilst a function element connected to the magnet is movable in dependence on the position of the magnet relative to the magnet segments of the magnetic track, the magnetic track extends at least partially along the circumference of a circle, whilst the device further comprises a holder which is rotatable about the central axis of the circle, which holder is provided with a number of clamping devices spaced from the central axis, each clamping device being provided with a function element and with a magnet that cooperates with the magnetic track, and each clamping device is provided at least with a housing and with a clamp forming the function element, which is movable with respect to the housing, which clamp is connected to the magnet, wherein said clamp is movable with respect to the housing in use as a result of the cooperation between the magnet and the magnet segments of the magnetic track.

4. A device according to claim 3, characterised in that the clamp is mounted for rotation about an axis of rotation in the housing, the clamping device being provided with a circular magnetic track comprising said magnet and further magnets, which magnets are of alternating polarity, wherein the circular magnetic track, and consequently the clamp, is rotatable about the axis of rotation in use upon rotation of the holder about the central axis.

5. A device according to claim 4, characterised in that the spacing between two successive magnet segments of the magnetic track is substantially the same as the spacing between two successive magnets of the circular magnetic track of the clamping device.

6. A device according to claim 3, characterised in that the clamp is mounted for sliding movement along an axis of translation extending parallel to the central axis in the housing, wherein the magnet connected to the clamp, and consequently the clamp, is translatable along the axis of translation in use upon rotation of the holder about the central axis.

7. A device according to claim 3, characterised in that the clamp is mounted for rotation about an axis of rotation in the housing, the clamping device being provided with a circular magnetic track comprising said magnet and further magnets, which magnets are of alternating polarity, wherein the circular magnetic track, and consequently the clamp, is rotatable about the axis of rotation in use upon rotation of the holder about the central axis, the clamp is mounted for sliding movement along an axis of translation extending parallel to the central axis in the housing, wherein the magnet connected to the clamp, and consequently the clamp, is translatable along the axis of translation in use upon rotation of the holder about the central axis, wherein the device comprises at least two magnetic tracks, wherein the first magnetic track cooperates with the circular magnetic track for rotating the clamp, whilst the second magnetic track cooperates with a magnet provided for translating the clamp.

8. A device according to claim 7, characterised in that the device is provided with two pairs of first and second magnetic tracks and also with two holders which are rotatable about the central axis, wherein clamping devices of the two holders are located opposite each other.

9. A device according to claim 8, characterised in that at least one cutting device is disposed between the holders, which cutting device is movable towards the clamping device and away from the clamping devices.

10. A device according to claim 9, characterised in that at least one blowing device is disposed between said holders.

11. A device according to claim 1, characterised in that the magnet and/or the magnetic track comprise(s) supermagnets and/or electromagnets.

12. A device according to claim 1, characterised in that the magnet and/or the magnetic track is (are) provided with a steel plate on a side remote from the magnet or the magnet segment cooperating therewith.

13. A method suitable for processing agricultural products, such as bulbous plants, using a device according to claim 1, characterised in that at least one magnet is moved with respect to a magnetic track comprising a number of magnet segments of alternating polarity, wherein said magnet is repelled or attracted and wherein a function element connected to the magnet is moved.

14. A method suitable for processing agricultural products, such as bulbous plants, using a device suitable for processing agricultural products such as bulbous plants, provided at least with a magnetic track comprising a number of magnet segments of alternating polarity, which device is further provided with at least one magnet which is movable with respect to the magnetic track, whilst a function element connected to the magnet is movable in dependence on the position of the magnet relative to the magnet segments of the magnetic track and characterised in that at least one magnet is moved with respect to a magnetic track comprising a number of magnet segments of alternating polarity, wherein said magnet is repelled or attracted and wherein a function element connected to the magnet is moved, and wherein an agricultural product is clamped between clamps near a receiving position, which clamps are moved together by means of magnets, whereupon the agricultural product is rotated together with the clamps about an axis of rotation extending through the clamps, whilst the agricultural product is also rotated by means of magnets about a central axis spaced from the axis of rotation and the agricultural product is subjected to a processing step, after which the clamps are moved apart by means of magnets near a delivery position.

15. A method according to claim 14, characterised in that the clamps are not rotated by means of magnets at least during part of their movement between the delivery position and the receiving position.

* * * * *